United States Patent [19]
Jones

[11] Patent Number: 6,154,700
[45] Date of Patent: *Nov. 28, 2000

[54] INTEGRATED TRANSMISSION AND MULTIPLE SPEED AXLE SHIFTING APPARATUS

[75] Inventor: Charles R. Jones, Ottawa Lake, Mich.

[73] Assignee: Dana Corporation, Toledo, Ohio

[ * ] Notice: This patent is subject to a terminal disclaimer.

[21] Appl. No.: 09/002,277

[22] Filed: Dec. 31, 1997

[51] Int. Cl.[7] .............................. G06F 7/00; G06F 17/00; G06F 19/00

[52] U.S. Cl. ................................. 701/51; 701/68; 701/69; 477/134; 477/35; 477/180; 475/162; 475/198; 475/207; 180/248; 180/249; 74/15.66

[58] Field of Search ................................. 701/51, 52, 68, 701/69; 180/248, 249; 477/180, 34, 35; 475/198, 162, 207; 74/15.66

[56] References Cited

U.S. PATENT DOCUMENTS

| | | |
|---|---|---|
| 1,091,618 | 3/1914 | Austin . |
| 2,193,431 | 3/1940 | Probst . |
| 2,503,026 | 4/1950 | Breese . |
| 2,858,713 | 11/1958 | Brownyer . |
| 3,313,182 | 4/1967 | Nallinger . |
| 4,324,153 | 4/1982 | Sugimoto et al. . |
| 4,667,536 | 5/1987 | Ehrlinger et al. ........................... 74/720 |
| 4,793,458 | 12/1988 | Shealy . |
| 4,881,627 | 11/1989 | Ishii ..................................... 192/0.076 |
| 5,067,599 | 11/1991 | Sliker et al. ............................. 192/0.32 |
| 5,109,731 | 5/1992 | Iwatsuki et al. . |
| 5,226,502 | 7/1993 | Kameda .................................. 180/248 |
| 5,275,253 | 1/1994 | Sperduti et al. ......................... 180/197 |
| 5,275,254 | 1/1994 | Shiraishi et al. ......................... 180/248 |
| 5,289,895 | 3/1994 | Takata et al. ............................. 180/248 |
| 5,378,211 | 1/1995 | Sliker et al. ............................. 477/175 |
| 5,448,478 | 9/1995 | Eto . |
| 5,450,767 | 9/1995 | Willford et al. . |
| 5,450,919 | 9/1995 | Shitani .................................... 180/233 |
| 5,630,773 | 5/1997 | Sliker et al. ............................. 477/176 |
| 5,685,389 | 11/1997 | Muller ..................................... 180/249 |
| 5,740,877 | 4/1998 | Sasaki ..................................... 180/248 |
| 5,754,967 | 5/1998 | Inoue et al. ............................... 701/54 |
| 5,803,197 | 9/1998 | Hara et al. ............................... 180/248 |
| 5,839,084 | 11/1998 | Takasaki et al. . |
| 5,871,419 | 2/1999 | Amendt ................................... 477/180 |
| 5,893,892 | 4/1999 | Loeffler ..................................... 701/29 |
| 5,899,951 | 5/1999 | Babbel et al. ............................. 701/67 |
| 5,927,425 | 7/1999 | Kusano ................................... 180/248 |
| 5,980,413 | 11/1999 | Anderson et al. ....................... 475/198 |

FOREIGN PATENT DOCUMENTS

0927657 A2 7/1999 European Pat. Off. .

OTHER PUBLICATIONS

Japanes Patent No. 411263153A; Drive train assembly for vehicle; Published: Sep. 28, 1999; inventor Jones; Assigne Dan Corp.

Primary Examiner—William A. Cuchlinski, Jr.
Assistant Examiner—Olga Hernandez
Attorney, Agent, or Firm—MacMillian, Sobanski & Todd, LLC

[57] ABSTRACT

An integrated system for automatically controlling the operation of both an automated mechanical transmission and a multiple speed axle assembly in a vehicle drive train assembly includes a transmission actuator for operating the transmission in any one of a plurality of transmission gear ratios. The system further includes an axle actuator for operating the axle assembly in any one of a plurality of axle gear ratios. An electronic controller is provided for operating the transmission in a desired one of the plurality of transmission gear ratios and for operating the axle assembly in a desired one of the plurality of axle gear ratios to provide a desired overall gear ratio for the vehicle. To accomplish this, the electronic controller is responsive to one or more input signals that represent operating parameters of the vehicle. When it is determined that a change in the overall gear ratio of the vehicle is necessary, the electronic controller operates one or both of the transmission actuator and the axle actuator to achieve the desired overall gear ratio. The determination of whether the transmission actuator alone is actuated, the axle actuator alone is actuated, or both the transmission actuator and the axle actuator are actuated will depend upon the specific gear ratios provided by the transmission and the axle actuator, the current overall gear ratio, the desired overall gear ratio, and other factors.

10 Claims, 2 Drawing Sheets

INTEGRATED TRANSMISSION AND MULTIPLE SPEED AXLE SHIFTING APPARATUS

BACKGROUND OF THE INVENTION

This invention relates in general to a vehicular drive train assembly including a transmission and a multiple speed axle for providing a desired speed reduction gear ratio between a source of rotational power and the driven wheels of the vehicle. More particularly, this invention relates to an integrated system for automatically controlling the operation of both an automated mechanical transmission and a multiple speed axle assembly in such a vehicle drive train assembly.

In virtually all land vehicles in use today, a transmission is provided in a drive train assembly between a source of rotational power, such as an internal combustion or diesel engine, and the driven axle and wheels of the vehicle. A typical transmission includes a case containing a transmission input shaft, a transmission output shaft, and a plurality of meshing gears. Means are provided for connecting selected ones of the meshing gears between the transmission input shaft and the transmission output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

To facilitate the operation of the transmission, it is well known to provide a clutch between the vehicle engine and the transmission. When the clutch is engaged, the transmission is driven by the vehicle engine to operate the vehicle at the selected gear ratio. To shift the transmission from a first gear ratio to a second gear ratio, the clutch is initially disengaged such that power is not transmitted from the vehicle engine to the transmission. This allows the gear shifting operation to occur within the transmission under a non-torque loading condition to prevent undesirable clashing of the meshing gear teeth. Thereafter, the clutch is re-engaged such that power is transmitted from the vehicle engine to the transmission to operate the vehicle at the second gear ratio.

A typical structure for a vehicle clutch includes a cover that is connected to a flywheel secured to the end of the output shaft of the vehicle engine for rotation therewith. A pressure plate is disposed within the clutch between the cover and the flywheel. The pressure plate is connected for rotation with the flywheel and the cover, but is permitted to move axially relative thereto. Thus, the flywheel, the cover, and the pressure plate are all constantly rotatably driven by the vehicle engine. Between the flywheel and the pressure plate, a driven disc assembly is disposed. The driven disc assembly is supported on the transmission input shaft for rotation therewith, but is permitted to move axially relative thereto. To engage the clutch, the pressure plate is moved axially toward the flywheel to an engaged position, wherein the driven disc assembly is frictionally engaged between the flywheel and the pressure plate. As a result, the driven disc assembly (and the transmission input shaft upon which it is supported) are driven to rotate with the flywheel, the cover, and the pressure plate. To disengage the clutch, the pressure plate is moved axially away from the flywheel to a disengaged position. When the pressure plate is moved axially to this disengaged position, the driven disc assembly is not frictionally engaged between the flywheel and the pressure plate. As a result, the driven disc assembly (and the transmission input shaft upon which it is supported) are not driven to rotate with the flywheel, the cover, and the pressure plate.

To effect such axial movement of the pressure plate between the engaged and disengaged positions, most vehicle clutches are provided with a release assembly including a generally hollow cylindrical release sleeve which is disposed about the transmission input shaft. The forward end of the release sleeve extends within the clutch and is connected through a plurality of levers or other mechanical mechanism to the pressure plate. In this manner, axial movement of the release sleeve causes corresponding axial movement of the pressure plate between the engaged and disengaged positions. Usually, one or more engagement springs are provided within the clutch to urge the pressure plate toward the engaged position. The engagement springs typically react between the release sleeve and the cover to normally maintain the clutch in the engaged condition. The rearward end of the release sleeve extends outwardly from the clutch through a central opening formed through the cover. Because the release sleeve is connected to the cover and the pressure plate of the clutch, it is also constantly driven to rotate whenever the vehicle engine is operating.

Thus, an annular release bearing is usually mounted on the rearward end of the release sleeve. The release bearing is axially fixed on the release sleeve and includes an inner race which rotates with release sleeve, an outer race which is restrained from rotation, and a plurality of bearings disposed between the inner race and the outer race to accommodate such relative rotation. The non-rotating outer race of the release bearing is typically engaged by an actuating mechanism for moving the release sleeve (and, therefore, the pressure plate) between the engaged and disengaged positions to operate the clutch.

In a conventional mechanical transmission, both the operation of the clutch and the gear shifting operation in the transmission are performed manually by an operator of the vehicle. For example, the clutch can be disengaged by depressing a clutch pedal located in the driver compartment of the vehicle. The clutch pedal is connected through a mechanical linkage to the outer race of the release bearing of the clutch such that when the clutch pedal is depressed, the pressure plate of the clutch is moved from the engaged position to the disengaged position. When the clutch pedal is released, the engagement springs provided within the clutch return the pressure plate from the disengaged position to the engaged position. Similarly, the gear shifting operation in the transmission can be performed when the clutch is disengaged by manually moving a shift lever which extends from the transmission into the driver compartment of the vehicle. Manually operated clutch/transmission assemblies of this general type are well known in the art and are relatively simple, inexpensive, and lightweight in structure and operation. Because of this, the majority of medium and heavy duty truck clutch/transmission assemblies in common use today are manually operated.

More recently, however, in order to improve the convenience of use of manually operated clutch/transmission assemblies, various structures have been proposed for partially or fully automating the shifting of an otherwise manually operated transmission. In a partially or fully automated manual transmission, the driver-manipulated clutch pedal may be replaced by an automatic clutch actuator, such as a hydraulic or pneumatic actuator. The operation of the automatic clutch actuator can be controlled by an electronic controller or other control mechanism to selectively engage and disengage the clutch without manual effort by the driver.

Similarly, the driver-manipulated shift lever may also be replaced by an automatic transmission actuator, such as a hydraulic or pneumatic actuator which is controlled by an electronic controller or other control mechanism to select and engage desired gear ratios for use.

In addition to the clutch/transmission structures described above, most land vehicles further include an axle assembly for transmitting the rotational power from the transmission output shaft to the driven wheels of the vehicle. A typical axle assembly includes a housing containing an axle input shaft that is connected through a differential gear assembly to a pair of axle output shafts. The axle input shaft is connected by a driveshaft assembly to the transmission output shaft so as to be rotatably driven thereby. The differential gear assembly splits the rotational power from the axle input shaft to the two axle output shafts and, therefore, rotatably drives the wheels of the vehicle. In some instances, the axle assembly is structured to provide only a single speed reduction gear ratio between the axle input shaft to the axle output shafts. In other instances, however, the axle assembly is structured to provide two (or possibly more) speed reduction gear ratios between the axle input shaft to the axle output shafts. Multiple speed axle assemblies are desirable because they extend the number of speed reduction gear ratios beyond those provided by the transmission in a relatively simple and cost efficient manner. For example, a four-speed transmission that is operaated in conjunction with a two-speed axle assembly provides a total of eight available gear ratios.

In these multiple speed axle assemblies, a manually operable mechanism is provided for shifting among the axle gear ratios. In the past, this manually operable mechanism included a mechanical linkage extending from the driver compartment of the vehicle to the axle assembly. The driver of the vehicle physically moved the mechanical linkage to shift among the axle gear ratios. More recently, however, this manually operable mechanism included an electrical switch connected to operate an electric motor provided on the axle assembly. The driver of the vehicle manually operated the electrical switch to control the operation of the electric motor to shift among the axle gear ratios.

As mentioned above, it is known to partially or fully automate the shifting of an otherwise manually operated transmission. However, a partially or fully automated transmission cannot readily be used with a manually operable multiple speed axle assembly. As mentioned above, the use of a multiple speed axle assembly is desirable because it extends the number of speed reduction gear ratios beyond those provided by the transmission in a relatively simple and cost efficient manner. Thus, it would be desirable to provide an integrated system for automatically controlling the operation of both an automated mechanical transmission and a multiple speed axle assembly in a vehicle drive train assembly.

SUMMARY OF THE INVENTION

This invention relates to an integrated system for automatically controlling the operation of both an automated mechanical transmission and a multiple speed axle assembly in a vehicle drive train assembly. The system includes a transmission actuator for operating the transmission in any one of a plurality of transmission gear ratios. The system further includes an axle actuator for operating the axle assembly in any one of a plurality of axle gear ratios. An electronic controller is provided for operating the transmission in a desired one of the plurality of transmission gear ratios and for operating the axle assembly in a desired one of the plurality of axle gear ratios to provide a desired overall gear ratio for the vehicle. To accomplish this, the electronic controller is responsive to one or more input signals that represent operating parameters of the vehicle. When it is determined that a change in the overall gear ratio of the vehicle is necessary, the electronic controller operates one or both of the transmission actuator and the axle actuator to achieve the desired overall gear ratio. The determination of whether the transmission actuator alone is actuated, the axle actuator alone is actuated, or both the transmission actuator and the axle actuator are actuated will depend upon the specific gear ratios provided by the transmission and the axle actuator, the current overall gear ratio, the desired overall gear ratio, and other factors.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
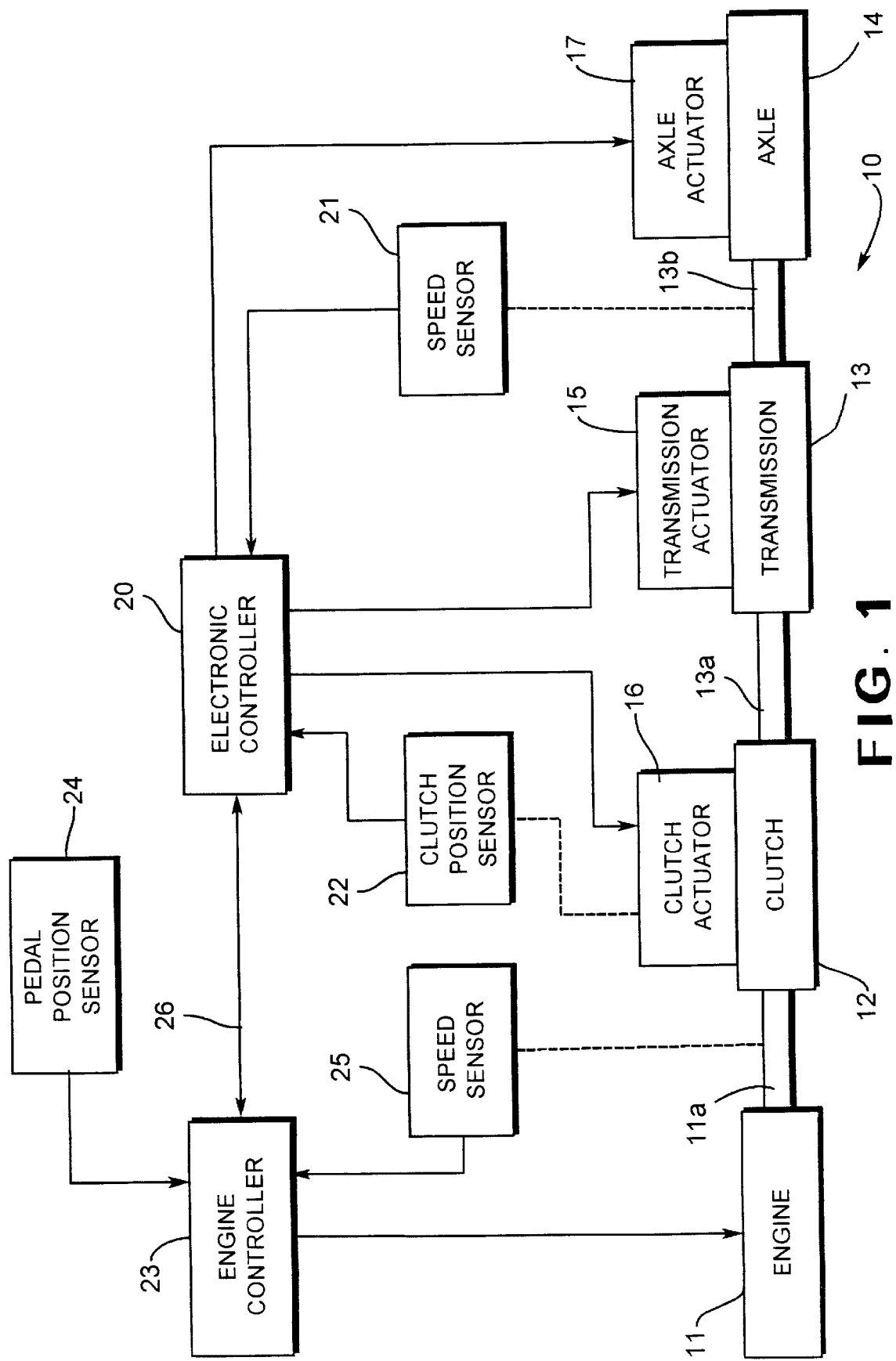
FIG. 1 is a block diagram of a vehicle drive train assembly including an integrated system for automatically controlling the operation of both the automated mechanical transmission and the multiple speed axle assembly.

Referring now to the drawings, there is illustrated in FIG. 1 a block diagram of a vehicle drive train assembly, indicated generally at 10, in accordance with this invention. The drive train assembly 10 includes a conventional engine 11 or other source of rotational power. The engine 11 is connected through an output shaft 11a, such as a crankshaft of the engine 11, to a clutch 12. The clutch 12 is also conventional in the art and functions to selectively connect the output shaft 11a of the engine 11 to an input shaft 13a of a transmission 13. The transmission 13 contains a plurality of meshing gears (not shown) that are selectively connected between the input shaft 13a and an output shaft 13b. The meshing gears contained within the transmission 13 are of varying size so as to provide a plurality of such gear ratios. By appropriately shifting among these various gear ratios, a desired speed reduction gear ratio can be provided between the input shaft 13a and the output shaft 13b of the transmission 13.

The output shaft 13b of the transmission 13 is connected through a conventional driveshaft (not shown) to a conventional multiple speed axle assembly 14. The axle assembly 14 includes one or more wheels (not shown) that are rotatably driven by the engine 11 whenever the clutch 12 is engaged. The multiple speed axle assembly 14 also contains a plurality of meshing gears (not shown) that are selectively connected between the output shaft 13b of the transmission 13 and the vehicle wheels. The meshing gears contained within the multiple speed axle assembly 14 are of varying size so as to provide a plurality (typically two) of such gear ratios. By appropriately shifting among these various gear ratios, a desired speed reduction gear ratio can be provided between the output shaft 13b of the transmission 13 and the vehicle wheels. By appropriately shifting among the various speed reduction gear ratios provided in both the transmission 13 and the multiple speed axle assembly 14, acceleration and deceleration of the vehicle can be accomplished in a smooth and efficient manner. This general structure for the drive train assembly 10 thus far described is well known in the art.

The illustrated transmission 13 may be either a partially or fully automated mechanical transmission. In a typical partially automated manual transmission, a driver-manipulated shift lever (not shown) engages and moves certain ones of a plurality of shift rails contained within the transmission to engage a first set of gear ratios for use. However, an automatically shifting transmission actuator 15 is provided on the transmission 13 to engage and move the remaining shift rails to engage a second set of gear ratios for use. For example, it is known to provide a partially automated manual transmission wherein the lower gear ratios are manually selected and engaged by the vehicle driver using the shift lever, while the higher gear ratios are automatically selected and engaged by the transmission actuator 15. One example of a typical partially automated manual transmission of this general structure is disclosed in detail in U.S. Pat. No. 5,450,767, owned by the assigned of this application. The disclosure of that patent is incorporated herein.by-reference. In a fully automated manual transmission, the driver-operated shift lever is usually replaced by the transmission actuator 15. The transmission actuator 15 functions to shift all of the shift rails contained within the transmission so as to select and engage all of the available gear ratios. The above-referenced patent discusses the adaptability of the disclosed partially automated transmission actuator 15 to fully automate the shifting of the transmission disclosed therein. However, it will be appreciated that this invention may be practiced with any desired structure for the transmission 13 and the transmission actuator 15.

To facilitate the automatic shifting of the transmission 15, the clutch 12 is provided with a clutch actuator 16. The structure and operation of the clutch actuator 16 are conventional in the art. Briefly, the clutch actuator 16 is provided to replace a driver-manipulated clutch pedal so as to partially or fully automate the operation of the clutch 12. The clutch actuator 16 is effective to operate the clutch 12 in either an engaged or disengaged mode. When the clutch 12 is engaged, the transmission 13 is driven by the vehicle engine 11 to operate the vehicle at a selected gear ratio. To shift the transmission 13 from a first gear ratio to a second gear ratio, the clutch 12 is initially disengaged such that power is not transmitted from the vehicle engine 11 to the transmission 13. This allows the transmission actuator 15 to effect a gear shifting operation within the transmission 13 under a non-torque loading condition to prevent undesirable clashing of the meshing gear teeth. Thereafter, the clutch 12 is re-engaged such that power is transmitted from the vehicle engine 11 to the transmission 13 to operate the vehicle at the second gear ratio. One structure that has been found to be acceptable for the clutch actuator 16 is disclosed in commonly owned U.S. patent application Ser. No. 08/891,625, filed Jul. 9, 1997, the disclosure of which is incorporated herein by reference. However, it will be appreciated that this invention may be practiced with any desired structure for the clutch 12 and the clutch actuator 16.

To facilitate the automatic shifting of the multiple speed axle assembly 14, an axle actuator 17 is provided. The structure and operation of the axle actuator 17 are conventional in the art. Briefly, the axle actuator 17 is provided to replace a driver-manipulated mechanical linkage or electrical switch/motor assembly so as to automate the operation of the axle assembly 14. The axle actuator 17 can include an electric motor (not shown) that is effective to operate the axle assembly 14 in a desired gear ratio. Typically, the axle assembly 14 is capable of providing two gear ratios, a first relatively low gear ratio and a second relatively high gear ratio. Thus, when the first gear ratio is engaged, the wheels of the vehicle are driven by the vehicle engine 11 to operate the vehicle at a relatively low gear ratio relative to the rotational speed of the output shaft 13b of the transmission 13. Similarly, when the second gear ratio is engaged, the wheels of the vehicle are driven by the vehicle engine 11 to operate the vehicle at a relatively high gear ratio relative to the rotational speed of the output shaft 13b of the transmission 13. The axle actuator 17 is provided to shift the axle assembly 14 between the first and second gear ratios in the manner described below. One structure that has been found to be acceptable for the axle actuator 17 is disclosed in commonly owned U.S. Pat. No. 4,793,458, issued Dec. 27, 1988, the disclosure of which is incorporated herein by reference. However, it will be appreciated that this invention may be practiced with any desired structure for the axle assembly 14 and the axle actuator 17.

The operation of the clutch actuator 16, the transmission actuator 15, and the axle actuator 17 are controlled by an electronic controller 20. The electronic controller 20 can be embodied as any conventional microprocessor or similar computing apparatus which can be programmed to operate the clutch actuator 16 (to effect automatic disengagement and engagement of the clutch 12), the transmission actuator 15 (to effect automatic shifting of the transmission 13 when the clutch 12 is disengaged), and the axle actuator 17 (to effect automatic shifting of the axle assembly 14) as described above. The operation of the electronic controller 20 will be described in detail below. A transmission output shaft speed sensor 21 provides an input signal to the electronic controller 20. The transmission output shaft speed sensor 21 is conventional in the art and is adapted to generate an electrical signal which is representative of the actual rotational speed of the output shaft 13b of the transmission 3. A clutch position sensor 22 also provides an input signal to the electronic controller 20. The structure and operation of the clutch position sensor 22 is conventional in the art and is adapted to provide an electrical signal to the electronic controller 20 that is representative of the actual position of the clutch 12 as it is moved between the engaged and disengaged positions.

An engine controller 23 is provided to control the operation of the vehicle engine 11. The engine controller 23 can also be embodied as any conventional microprocessor or similar computing apparatus which can be programmed to operate the engine 11 in a desired manner. Primarily, the engine controller 23 controls the operation of the engine 11 in response to an input signal generated by an accelerator pedal position sensor 24. The accelerator pedal position sensor 24 is conventional in the art and is adapted to generate an electrical signal which is representative of the actual position of the accelerator pedal (not shown) of the vehicle. As is well known, the accelerator pedal is physically manipulated by the foot of the driver of the vehicle to control the operation thereof. The accelerator pedal is depressed by the driver when it is desired to increase the speed of the engine 11 and move the vehicle. Conversely, the accelerator pedal is released when it is desired to decrease the speed of the engine 11 to slow or stop such movement of the vehicle. Thus, the engine controller 23 controls the speed of the engine 11 in response to the signal from the accelerator pedal position sensor 24 so as to operate the vehicle as desired by the driver. The accelerator pedal position sensor 24 may, if desired, be replaced by a throttle position sensor (not shown) or other driver-responsive sensor which generates a signal which is representative of the desired speed or mode of operation of the vehicle. A second input to the engine controller 23 is an engine output shaft speed sensor 25. The engine output shaft speed sensor 25 is conventional in the art and is adapted to generate an electrical signal which is representative of the actual rotational speed of the output shaft 11a of the engine 11.

The electronic controller 20 and the engine controller 23 communicate with one another over a data bus line 26 extending therebetween. In a manner which is generally conventional in the art, the electronic controller 20 and the engine controller 23 are programmed to communicate and cooperate with one another to so as to control the operation of the vehicle in a manner desired by the driver of the vehicle. Specifically, the electronic controller 20 and the engine controller 23 are effective to control the operation of the engine 11, the clutch 12, the transmission 13, and the axle assembly 14 in such a manner that the vehicle can be started and stopped solely by physical manipulation of the accelerator and brake pedals, similar to a conventional automatic transmission in a passenger car. To accomplish this, the signals from the accelerator pedal position sensor 24 and the engine output shaft speed sensor 25 are available to the electronic controller 20 over the data bus line 26. Alternatively, the signals from the accelerator pedal position sensor 24 and the engine output shaft speed sensor 25 can be fed directly to the electronic controller 20.

In the illustrated embodiment, the electronic controller 20 is responsive to the input signals generated by the speed sensor 21, the clutch position sensor 22, and the engine controller 23 for controlling the operation of the clutch actuator 16, the transmission actuator 15, and the axle actuator 17. However, the electronic controller 20 may be responsive to any desired number of input signals, including those representing operating parameters of the vehicle other than specifically shown, for controlling the operation of the clutch actuator 16, the transmission actuator 15, and the axle actuator 17. The specific nature of the algorithm or program executed by the electronic controller 20 will vary somewhat from vehicle to vehicle. However, in general, the electronic controller 20 is responsive to the input signals for causing shifting to occur in either or both of the transmission 13 and the axle assembly 14 to achieve a desired overall gear ratio for the vehicle. By appropriately shifting the transmission 13 and the axle assembly 14, acceleration and deceleration of the vehicle can be accomplished in a smooth and efficient manner.

Figure 2:
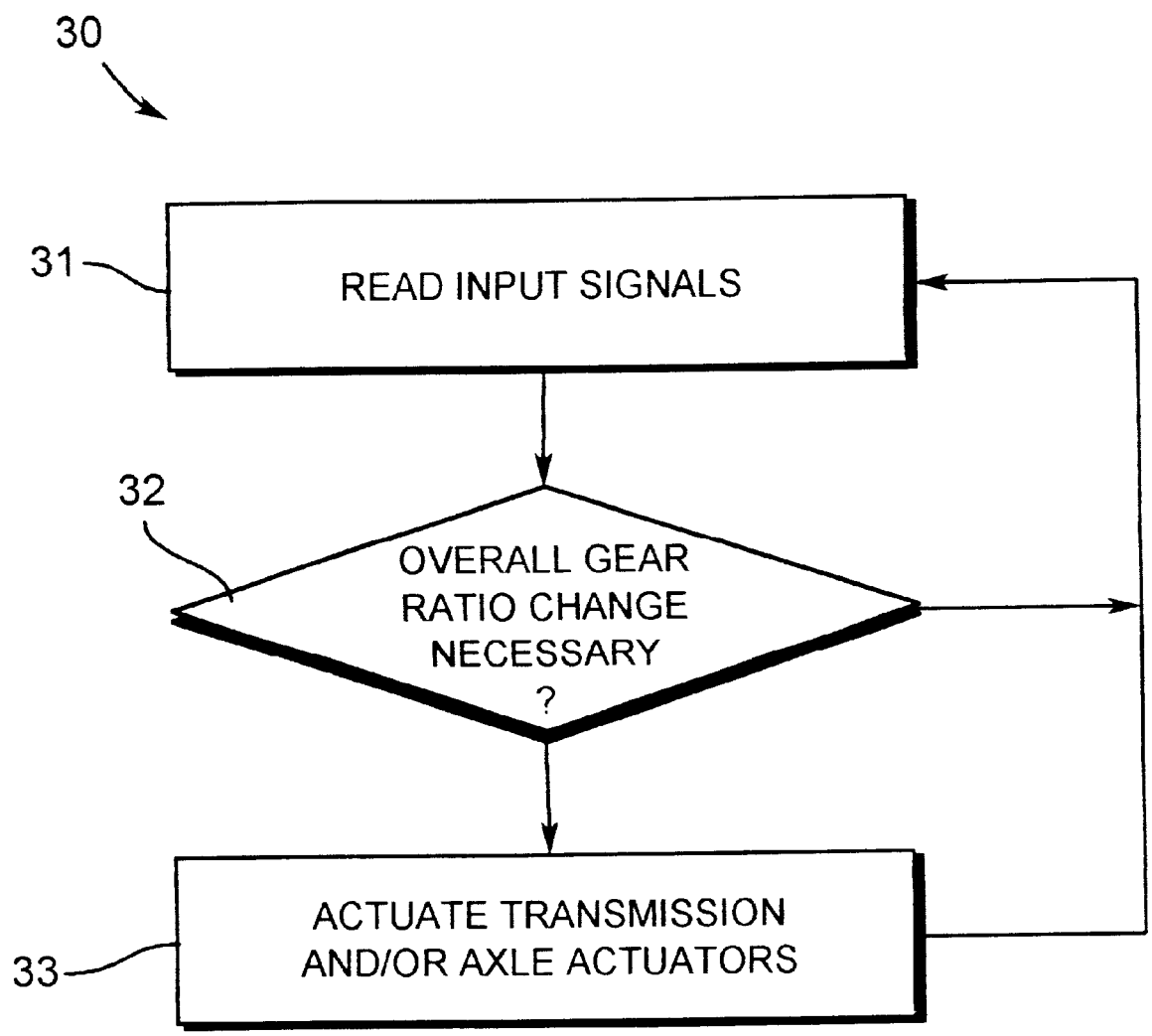
FIG. 2 is a flow chart that illustrates a simplified algorithm for controlling the operation of the electronic controller illustrated in FIG. 1.

FIG. 2 is a flow chart, indicated generally at 30, that illustrates a simplified algorithm for controlling the operation of the electronic controller 20 illustrated in FIG. 1. In a first step 31 of the algorithm, the electronic controller 20 reads some or all of the input signals supplied thereto. Then, the algorithm 30 enters a decision point 32 wherein the electronic controller 20 determines if a change in the overall gear ratio of the vehicle is necessary based upon predetermined criteria. Typically, this predetermined criteria is stored in the permanent memory of the electronic controller 20. As mentioned above, the specifics of the predetermined criteria will vary from vehicle to vehicle. This invention contemplates that any desired predetermined criteria may be used to determine if a change in the overall gear ratio of the vehicle is necessary. If the electronic controller 20 determines that no change in the overall gear ratio of the vehicle is currently necessary, the algorithm 30 branches back to the first step 31, wherein the electronic controller 20 again reads some or all of the input signals supplied thereto.

If, however, the electronic controller 20 determines that a change in the overall gear ratio of the vehicle is currently necessary, the algorithm 30 branches to an instruction point 33 wherein one or both of the transmission actuator 15 and the axle actuator 17 are operated to achieve the desired gear ratio. The determination of whether the transmission actuator 15 alone is actuated, the axle actuator 17 alone is actuated, or both the transmission actuator 15 and the axle actuator 17 are actuated will depend upon the specific gear ratios provided by the transmission 13 and the axle actuator 14, the current overall gear ratio, the desired overall gear ratio, and other factors that are well known in the art. Usually, the clutch actuator 16 is initially actuated by the electronic controller 20 to disengage the clutch 12 prior to actuating the transmission actuator 15 to shift the transmission 13. The axle actuator 14 may be actuated at the same time so that shifting occurs under a non-torque loading condition. Alternatively, the axle actuator 17 may be embodied using a conventional spring-loaded structure that pre-biases the axle assembly 14 to automatically shift whenever the magnitude of the torque therein drops below a predetermined level. After the appropriate shifting has been effected, the algorithm 30 branches back to the first step 31, wherein the electronic controller 20 again reads some or all of the input signals supplied thereto.

For the sake of illustration, let it be assumed that the transmission 13 is capable of providing four different forward gear ratios designated as first, second, third, and fourth transmission gear ratios. Let it further be assumed that the axle assembly 14 is capable of providing two different gear ratios designated as low and high axle gear ratios, and that the difference between the axle gear ratios is greater than the difference between any of the adjacent transmission gear ratios. If the vehicle is at rest when the accelerator pedal is depressed, the electronic controller 20 will determined that the vehicle should be operated in a first overall gear ratio. To accomplish this, the electronic controller 20 initially actuates the transmission actuator 15 to shift the transmission 13 into the first transmission gear ratio and the axle actuator 17 to shift the axle assembly 14 in the low axle gear ratio. The combination of the first transmission gear ratio and the low axle gear ratio achieves the first overall gear ratio. If the vehicle is gradually accelerated, the electronic controller 20 will subsequently determine that the vehicle should be operated sequentially through second, third, and fourth overall gear ratios. This is accomplished by actuating the transmission actuator 15 to shift the transmission 13 into the second, third, and fourth transmission gear ratios, while maintaining the axle assembly 14 in the low axle gear ratio.

To achieve a fifth overall gear ratio, the electronic controller will then actuate the transmission actuator 16 to shift the transmission 13 back to the first transmission gear ratio, while actuating the axle actuator 17 to shift the axle assembly 14 into the high axle gear ratio. Thereafter, the electronic controller 20 will actuate the transmission actuator 16 to shift the transmission 13 sequentially through the second, third, and fourth transmission gear ratios while maintaining the axle assembly 14 in the high axle gear ratio to achieve sixth, seventh, and eighth overall gear ratios. Downshifting can occur in a similar manner. It will be appreciated that one or more gear ratios may be skipped, depending upon the operating conditions of the vehicle. It will further be appreciated that shifting of the transmission 13 and the axle assembly 14 can vary from that described above, depending upon the specific gear ratios provided thereby.

It can be seen that the above-described electronic control system provides an integrated system for automatically controlling the operation of both the automated mechanical transmission 13 and the multiple speed axle assembly 14 in the vehicle drive train assembly 10. As a result, the number of overall gear ratios that are provided extends well beyond those provided individually by the transmission 13 and the axle assembly 14. Furthermore, the provision of these additional overall gear ratios is accomplished in a relatively simple and cost efficient manner, while allowing partial or fully automatic shifting of both the transmission 13 and the axle assembly 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive train assembly for a vehicle comprising:
   a source of rotational power;
   a transmission connected to said source of rotational power and operable in a plurality of transmission gear ratios;
   an axle assembly connected to said transmission and operable in a plurality of axle gear ratios; and
   a controller for operating said transmission in a desired one of said plurality of transmission gear ratios and for operating said axle assembly in a desired one of said plurality of axle gear ratios to provide a desired overall gear ratio for the vehicle.

2. The drive train assembly defined in claim 1 wherein said transmission includes a transmission actuator for shifting said transmission among said plurality of transmission gear ratios, and wherein said controller operates said transmission actuator.

3. The drive train assembly defined in claim 1 wherein said axle includes an axle actuator for shifting said axle assembly among said plurality of axle gear ratios, and wherein said controller operates said axle actuator.

4. The drive train assembly defined in claim 1 wherein said transmission includes a transmission actuator for shifting said transmission among said plurality of transmission gear ratios, said axle includes an axle actuator for shifting said axle assembly among said plurality of axle gear ratios, and said controller operates said transmission actuator and said axle actuator.

5. The drive train assembly defined in claim 1 wherein said controller is an electronic controller.

6. The drive train assembly defined in claim 1 further including a sensor for generating a signal that is representative of an operating condition of the vehicle, and wherein said controller is responsive to said signal for operating said transmission in a desired one of said plurality of transmission gear ratios and for operating said axle assembly in a desired one of said plurality of axle gear ratios to provide a desired overall gear ratio for the vehicle.

7. The drive train assembly defined in claim 1 further including a plurality of sensors for generating signals that are representative of a plurality of operating conditions of the vehicle, and wherein said controller is responsive to said signals for operating said transmission in a desired one of said plurality of transmission gear ratios and for operating said axle assembly in a desired one of said plurality of axle gear ratios to provide a desired overall gear ratio for the vehicle.

8. The drive train assembly defined in claim 1 further including a clutch connected between said source of rotational power and said transmission.

9. The drive train assembly defined in claim 8 wherein said clutch includes a clutch actuator for selectively connecting said source of rotational power to said transmission, and wherein said controller operates said clutch actuator.

10. The drive train assembly defined in claim 8 wherein said clutch includes a clutch actuator for selectively connecting said source of rotational power to said transmission, said transmission includes a transmission actuator for shifting said transmission among said plurality of transmission gear ratios, said axle includes an axle actuator for shifting said axle assembly among said plurality of axle gear ratios, and said controller operates said clutch actuator, said transmission actuator, and said axle actuator.

\* \* \* \* \*